United States Patent [19]

Olson

[11] 4,184,166
[45] Jan. 15, 1980

[54] LOCOMOTIVE PERFORMANCE RECORDER

[75] Inventor: Herbert H. Olson, Jackson, Mich.

[73] Assignee: Aeroquip Corporation, Jackson, Mich.

[21] Appl. No.: 929,018

[22] Filed: Jul. 28, 1978

[51] Int. Cl.² .......................... G01D 9/28; G01D 9/36
[52] U.S. Cl. ...................................... 346/49; 346/73; 346/114
[58] Field of Search ................... 346/18, 49, 73, 114; 73/489

[56] References Cited

U.S. PATENT DOCUMENTS

| | | | |
|---|---|---|---|
| 404,032 | 5/1889 | Currier | 346/18 |
| 686,935 | 11/1901 | Flaman | 346/49 |
| 866,397 | 9/1907 | Smith | 346/18 |
| 887,823 | 5/1908 | Livtschak | 346/49 |
| 1,138,011 | 5/1915 | Park et al. | 346/49 |
| 1,458,451 | 6/1923 | Wallbillich | 346/49 |
| 1,516,808 | 11/1924 | Duncan | 346/49 |
| 2,577,950 | 12/1951 | Clark | 346/18 |
| 3,345,636 | 10/1967 | McLaren | 346/18 |
| 3,673,608 | 6/1972 | Voorman | 346/18 |
| 3,872,479 | 3/1975 | Ramsey | 346/18 |

Primary Examiner—Monroe H. Hayes
Attorney, Agent, or Firm—Collins, Oberlin & Darr

[57] ABSTRACT

Apparatus for recording and displaying a graphic representation of the operating performance of a railroad locomotive by monitoring the response of its engine to a throttle control setting. The apparatus includes a chart paper recording device driven in relation to time and a marking mechanism actuated by a governor and referenced to its balance position at normal operation of the locomotive engine. The marking mechanism includes a pair of fixed styli and a movable stylus for producing a graph on the chart paper. The pair of fixed styli produce a pair of spaced-apart parallel datum traces on the chart paper wherein the area therebetween represents the normal governor balance position for a specified throttle setting. The movable stylus actuated by the governor produces a single trace on the chart paper relative to the parallel datum traces and represents the movement of the governor as it seeks to maintain its normal balance position.

11 Claims, 9 Drawing Figures

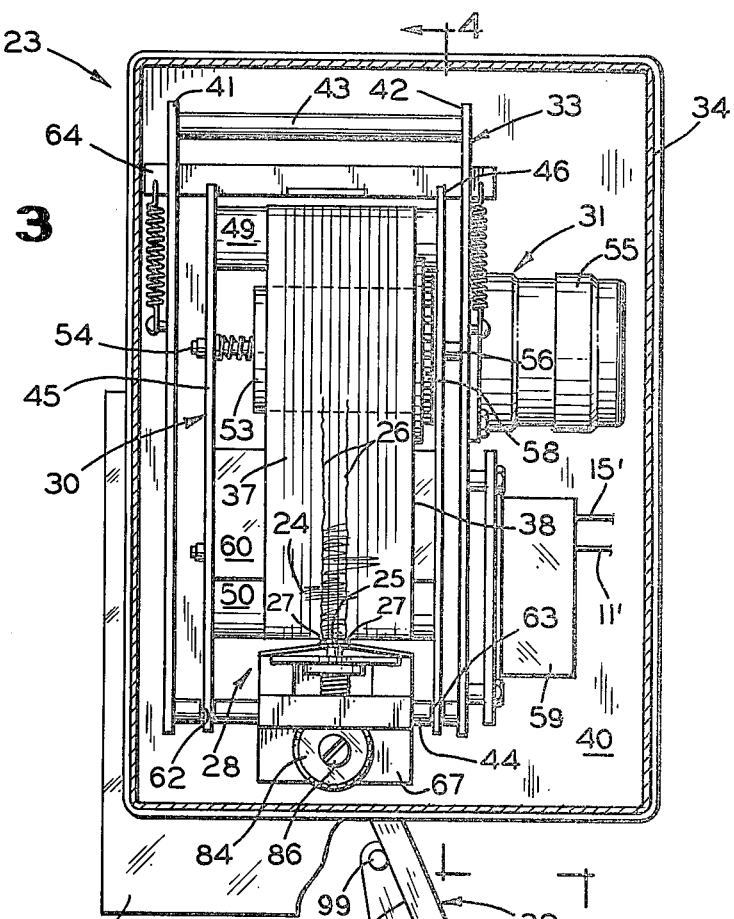
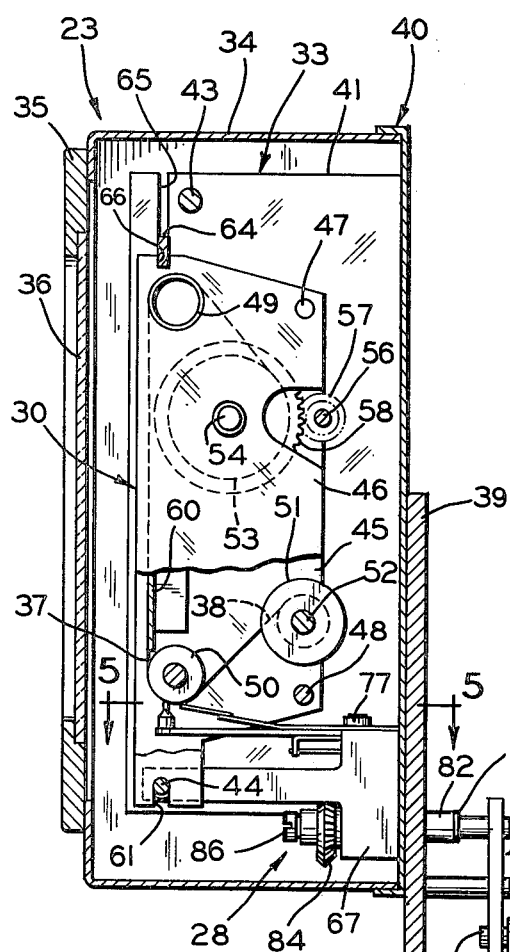
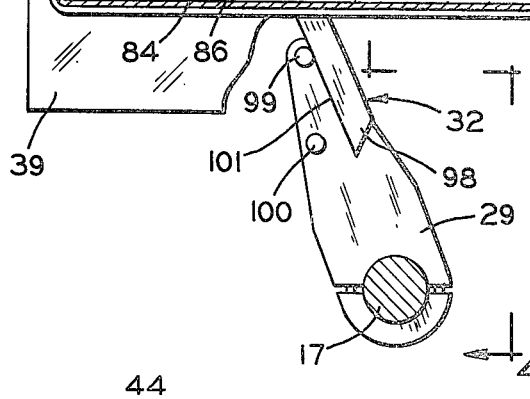
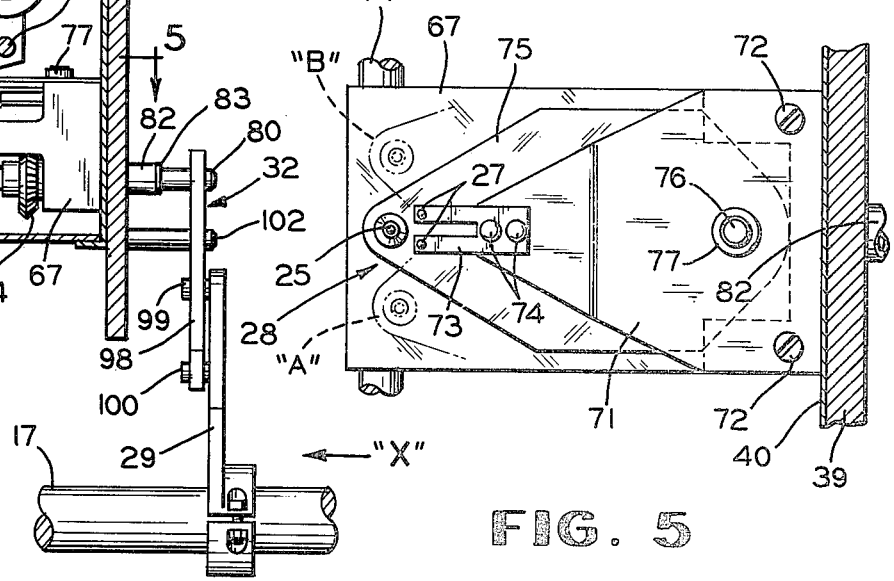
FIG. 3
FIG. 4
FIG. 5

LOCOMOTIVE PERFORMANCE RECORDER

BACKGROUND OF THE INVENTION

1. Field of the Invention

This invention generally relates to a recording apparatus and more particularly to a recording apparatus for producing a visual trace of the operating performance of a railroad locomotive with respect to the governor balance of a diesel engine relative to specific throttle settings.

2. Description of the Prior Art

As is well known, locomotives used by the railroad industry today are complex machines mainly powered by diesel engines, driving an electrical generator which in turn supplies electrical energy to traction motors. Typically, the output of the diesel engine is controlled by a throttle acting through a governor which responds to changes in load to maintain the speed (RPM) of the engine at a set value for each throttle position. The positions of the governor at the throttle settings of the engine are known as the power balance positions of the governor. A locomotive may be considered to operate in a normal or non-normal manner in a particular throttle setting. For the most part, both normal and non-normal operation of the locomotive can be identified by the balance positions of the governor. For example, in normal operation, the governor tends to balance in a definite stable position relative to a particular throttle setting. However, the action of the governor may be unstable due to protective systems built into the governor control for preventing damage under temporary adverse conditions. For instance, one protective system may cause a temporary unstable governor balance by frequent instantaneous power reduction for reducing wheel slip under slippery track conditions. Another protective system may change the governor balance position without a change in throttle position for reducing power for preventing electrical damage at low locomotive speeds. Generally, these conditions are of no concern as they are of short duration relative to the overall operation of the locomotive.

On the other hand, there are many malfunctioning and deteriorating conditions which may occur during the operation of the locomotive which affect the balance of the governor controlling the diesel engine over extended periods of time. For example, the balance position of the governor may be unstable for extended periods due to uneven wheel wear causing excessive slipping of the locomotive wheels or the governor may never assume its normal balance position because the diesel engine may have plugged fuel lines, broken rocker arms, faulty turbocharging units and etc.

It has been discovered that if a record of the balance position of the governor controlling the speed (RPM) of the diesel engine during operation of the locomotive, is frequently observed, a determination can be made of normal or non-normal locomotive operation. If a non-normal operation is observed, action can then be taken so that preventative maintenance, service and/or repair of the locomotive can be performed prior to a potential breakdown. As contemplated by the invention, the record of the engine's governor balance positions is observed to determine if the locomotive (1) is functioning normally, (2) is excessively unloading, (3) is overloaded, (4) is operating at low power outputs for extended periods of time, (5) is operating between intermittent periods of normal and low power outputs or (6) the governor is excessively hunting or unstable for extended periods of time.

SUMMARY OF THE INVENTION

Briefly, the present invention is directed to an apparatus which senses and records on a chart paper roll, the operating conditions imposed on the locomotive diesel engine. More specifically, the apparatus comprises a chart paper recording device driven in relation to time and recording means actuated by the governor controlling the diesel engine for producing a graphic record upon the chart paper. The recording means includes a pair of fixed styli for producing a pair of spaced-apart parallel datum traces and a movable stylus actuated by a control element of the diesel engine for producing a second trace relative to the datum traces. The spaced-apart datum traces are representative of the normal balance position of the governor at a particular throttle setting and the second trace is representative of the actual movement of the governor balance as it seeks its normal balance position wherein a determination can be made of normal or non-normal operation of the locomotive.

OBJECTS AND ADVANTAGES

An object of this invention is to provide a graphic representation of the operating performance of a railroad locomotive based on the actual movement of the governor balance controlling the speed (RPM) of the diesel engine for use in the locomotive maintenance service and/or repair.

Another object of the invention is to provide a graph on chart paper representing actual governor balance movement relative to its normal balance position for determining power output of the diesel engine during operation of the locomotive.

Other objects and advantages will become more apparent during the course of the following description, when taken in connection with the accompanying drawings.

BRIEF DESCRIPTION OF THE DRAWINGS

In the drawings, wherein like numerals are employed to designate like parts throughout the same:

FIG. 3 is a front view of the recording apparatus with the housing removed, particularly illustrating the record paper device;

FIG. 4 is a vertical section taken substantially along line 4—4 of FIG. 3;

FIG. 5 is an enlarged horizontal fragmentary view taken substantially along line 5—5 of FIG. 4;

FIG. 8 is a fragmentary view looking in the direction of arrow "X" in FIG. 4 and illustrating the actuating mechanism connecting the recording apparatus to the lay shaft of the diesel engine, the movement thereof being shown in broken lines.

DESCRIPTION OF THE PREFERRED EMBODIMENT

Figure 1:
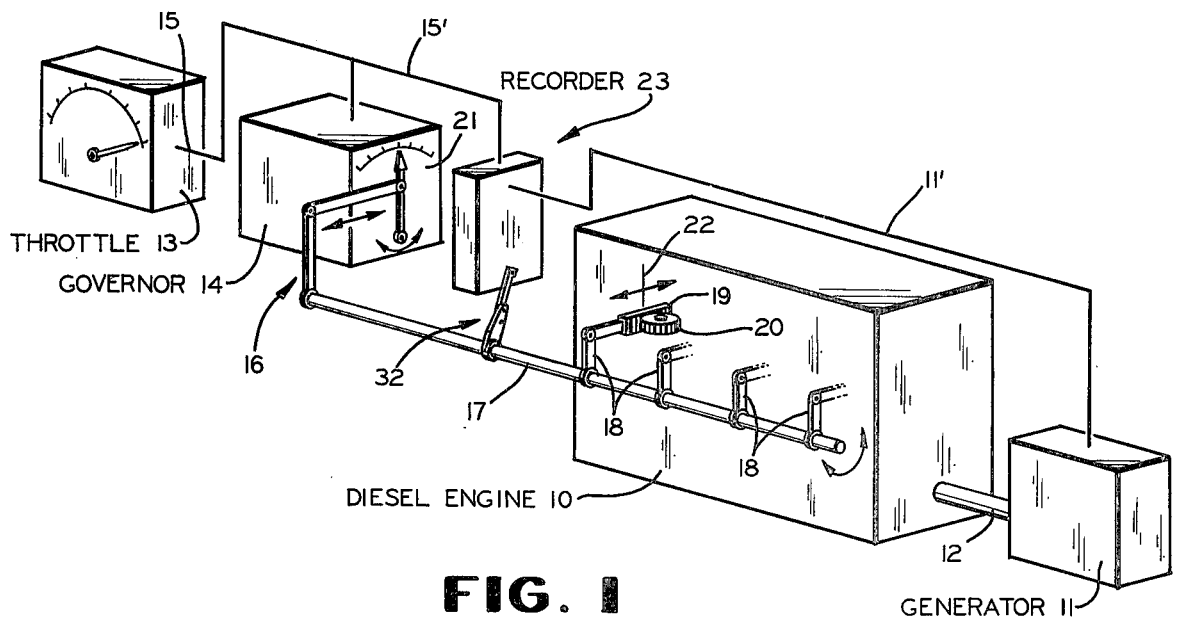
FIG. 1 is a diagrammatic view illustrating the relationship of various components of a typical railroad locomotive incorporating the present invention.

Generally, the railroad locomotive per se forms no part of the invention and the following description is purely for exemplary purposes. As diagrammatically illustrated in FIG. 1, a typical railroad locomotive includes a diesel engine 10 which drives an electrical generator 11 through a shaft 12; the generator 11 supplying electrical power to traction motors (not shown) which drive the traction wheels (also not shown) of the locomotive.

Conventionally, the output of the diesel engine 10 is controlled by a throttle 13 having a eight (8) engine or power settings acting through a governor 14. The throttle 13 is an electro-mechanical type of device whose output comprises different combinations of four (4) electrical voltages for each of its settings. These voltages are applied to the govenor 14 through a multi-conductor cable 15 for commanding the governor to order and maintain a specified speed (RPM) of the diesel engine 10 regardless of changes in loads (within certain limits) imposed thereon. The speed of the diesel engine 10 is, of course, regulated by the governor controlling the opening and closing of cylindrical fuel injector valves (not shown) at each engine cylinder.

The governor 14 is a servo-mechanism type of device which assumes a normal balance position for each of the eight (8) throttle settings; the balanced conditions being determined by a match between a speed monitoring feedback signal from the diesel engine 10 and the command signals generated by the throttle 13. The command signals may be modified by the protective systems as previously mentioned. The governor 14 is mechanically connected by a linkage mechanism 16 to a lay shaft 17 of the diesel engine to rotate the lay shaft 17 to-and-fro through a small angle. The lay shaft 17 is, in turn, operatively connected to each fuel injector valve of the engine by a crank and linkage device 18 (only one shown) to a gear rack 19. Accordingly, the gear rack 19 is moved in a linear path and rotates a meshing pinion gear 20 through a small angle which in turn rotates the cylindrical fuel injector valve at each cylinder. A scale and indicator device 21 is provided at the output side of the governor 14 indicating the balance position of each throttle position in inches of travel of the gear rack 19 from a datum position represented by the reference numeral 22 in FIG. 1. Thus, at each throttle setting the governor has a normal balance position referenced to the datum position 22 of the gear rack 19. These positions of the gear rack serve as reference points for corelating the governor balance positions with a recording apparatus constructed in accordance with the invention and generally designated by the reference numeral 23.

As contemplated by this invention and illustrated in FIG. 3, the recorded data comprises a graph having a trace 24 produced by a movable stylus 25 based on the position of the gear racks 19 and two fixed datum traces 26 produced by a pair of fixed styli 27. When the trace 24 lies between the datum traces 26 it represents the normal governor balance position at normal or optimum operation of the engine 10 at the particular throttle setting. The trace 24, identified as the second trace and produced by the movable stylus, is actuated by a mechanism designated in its entirety by the reference numeral 28 which will be described in detail hereinafter. The mechanism 28 is designed to provide a specified relationship between the normal governor rack scale balance position for the throttle setting represented by the two fixed datum traces 26 and the actual rack scale balance of the engine 10. As illustrated in FIG. 1, the recording apparatus 23 is located in close proximity to the governor 14 and operatively connected to the lay shaft 17 by a crank arm 29 (see FIG. 2) for operation thereby.

Figure 2:
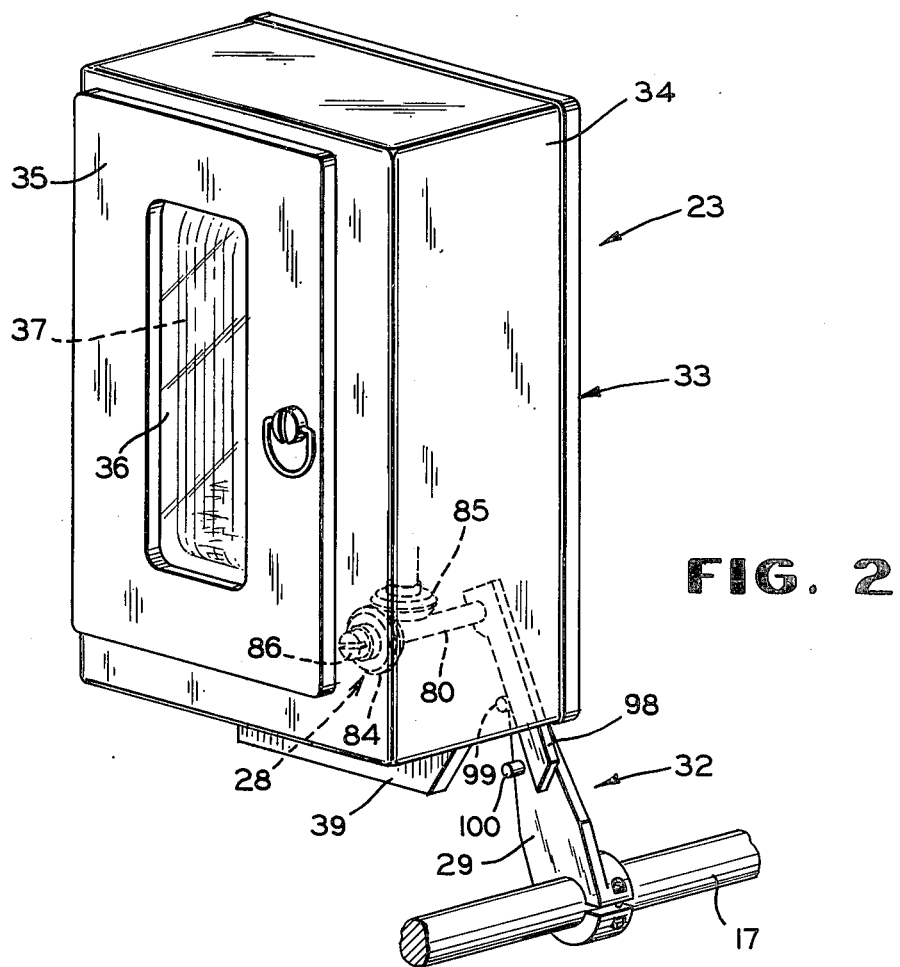
FIG. 2 is a perspective view of the recording apparatus constructed in accordance with the invention and illustrating its connection to the lay shaft of the diesel engine.

Briefly and as best illustrated in FIGS. 3 and 4, the recording apparatus 23 generally comprises a removable cartridge designated in its entirety by the reference numeral 30, a paper drive mechanism 31 (see FIG. 4) therefor, the mechanism 28 and means 32 for actuating the marking device and means 32 for actuating the marking mechanism 28. Except for the crank arm 29, all the above-mentioned components are supported on a chassis weldment assembly 33 and, except for the means 32, all are enclosed within a housing 34 mounted on the chassis assembly 33. Referring now to FIGS. 2 and 4, the housing 34 is provided with a door 35 hingedly secured (not shown) thereto which has a window 36, the door and window providing easy access to the cartridge 30 and viewing an exposed section 37 of a chart paper 38, respectively.

As best illustrated in FIGS. 3 and 4, the chassis assembly 33 includes an attachment plate 39 on which are fixedly attached a frame 40 having a pair of upstanding plate members 41 and 42 interconnected in a spaced-apart parallel relationship by upper and lower space rods 43 and 44, respectively. The attachment plate 39 is adapted to secure the chassis assembly 33 to a wall (not shown) of the locomotive engine compartment.

Still referring to FIGS. 3 and 4, the removable cartridge 30 includes an open framework having a pair of side plates 45 and 46 interconnected in a spaced-apart parallel relationship by upper and lower spacer rods 47 and 48, respectively, and upper and lower idler rollers 49 and 50, respectively. As best illustrated in FIG. 4, a paper supply spool 51 is rotatably mounted on a shaft 52 extending between the side plates 45 and 46. A driven paper take-up spool 53 is rotatably mounted on a shaft 54 also extending between the side plates 45 and 46.

The drive mechanism 31 for driving the paper take-up spool 53 generally comprises an electric motor 55 mounted on the plate member 42 of the chassis 33 and has a shaft 56 extending through the plate member 42 (see FIG. 4). As best illustrated in FIG. 4, a pinion gear 57 mounted on the shaft 56 meshes with a driven gear 58 fixedly mounted on one end of the take-up spool 53. The control voltages applied to the governor 14 are also applied to a relay board 59 which is mounted below the motor 55 on the plate member 42. To this end, a branch conductor 15' extending between the multi-conductor cable 15 and the relay board 59 connects the control voltages thereto (see FIG. 3). A combination of relay contacts (not shown) corresponding to the control voltages connects the motor 55 to a driving voltage supplied from the generator 11 through a conductor cable 11' (see FIG. 1) which is also connected to the relay board 59. Accordingly, the motor when energized, drives the take-up spool 53 through the gears 57 and 58 preferably at a speed (RPM) whereat approximately one and one quarter (1 ¼) inches (31.5 mm) of paper travel equals about one (1) hour of engine operation.

A roll of the chart paper 38 is mounted on the supply spool 51 and issues therefrom to pass over the lower roller 50 and then passing behind the window 36 (when the door 35 is closed) over a table 60 disposed between and affixed to the side plates 45 and 46 from whence it passes over the upper roller 49 (preferably non-rotatable) for reception upon the driven take-up spool 53.

The cartridge 30 is removably mounted on the chassis 33 between the plate members 41 and 42 and for this purpose the bottom end of each side plate 45 and 46 of the cartridge 30 is provided with an open end slot 61 (only one shown in the side plate 45), each engaging a groove 62 and 63 respectively, provided in the lower spacer rod 44 of the chassis 33 for removably supporting the cartridge 30 on the chassis 33. The upper end of the cartridge 30 is detachably secured to the chassis 33 by a spring loaded latch bar 64. To this end, the latch bar 64 is movably mounted on the chassis 33 in slots 65 (only one shown), a slot 65 being provided in the upper end of each chassis plate member 41 and 42. The latch bar 64 engages detent 66 provided in the upper end of each side plate 45 and 46 (only one shown in the plate 46 of the cartridge 30) as illustrated in FIG. 4.

Referring now to FIGS. 4 through 7, the movable stylus 25, the mechanism 28 for operating the stylus 25 and the pair of fixed styli 27 are all supported on a mounting block 67 secured to the chassis 33. More specifically, the mounting block 67 is secured in the bottom portion of the chassis 33 by having the projecting end of a bushing 68 extending from one end of the block 67 and engaging a pilot hole 69 provided in the plate 39, while its other end is supported by the lower spacer rod 44 of the chassis 33 passing through an aperture 70 therein.

Figure 7:
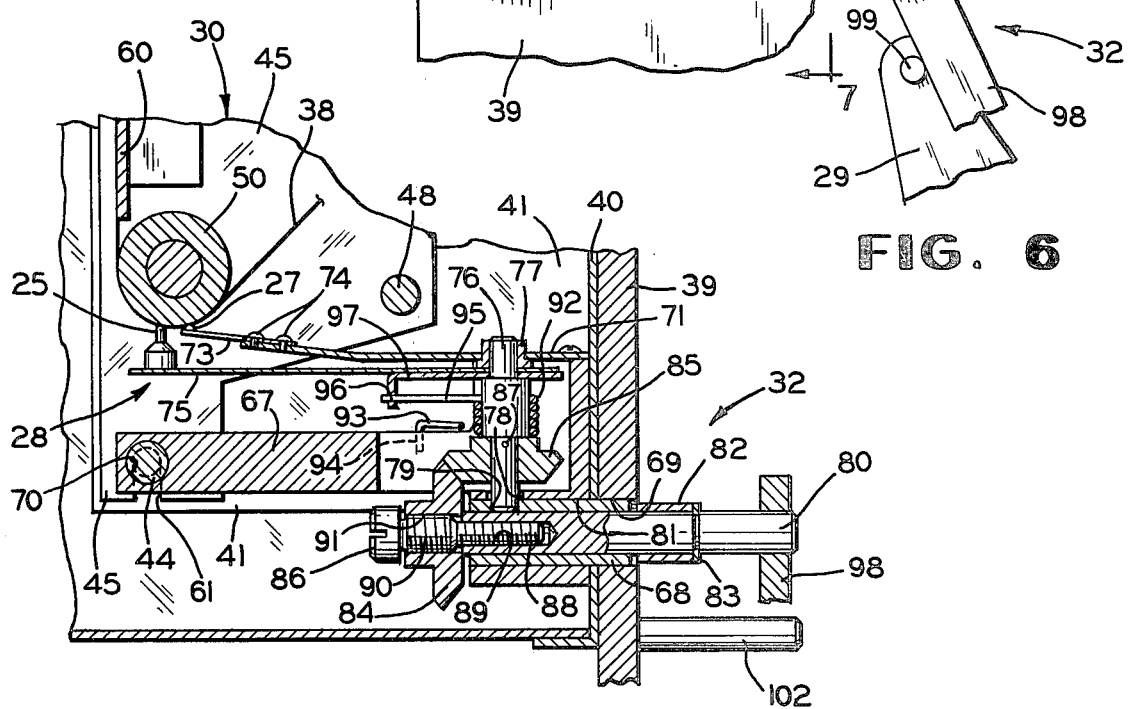
FIG. 7 is an enlarged fragmentary vertical sectional view taken substantially along lines 7—7 of FIG. 6 illustrating the drive mechanism of the movable stylus.

As best illustrated in FIGS. 5 and 7, the fixed styli 27 are supported on the mounting block 67 in a position to bear against the lower idler roller 50. More specifically, a support plate 71 is firmly attached to the top of the mounting block 67 by cap screws 72 (see FIG. 5) on a bifurcated spring member 73 wherein a stylus 27 is mounted on each of the bifurcated spring ends so as to resiliently bear against the idler roller 50. The spring member 73 is attached to the free end of the support plate 71 by a pair of rivets 74 substantially as illustrated in FIG. 5.

The movable stylus 25 is mounted on an oscillating plate 75 and also bears against the lower idler roller 50. As best illustrated in FIG. 7, the oscillating plate 75 is mounted on a vertically disposed rotatable shaft 76 which is part of the mechanism 28, for movement therewith. One end of the shaft 76 is journalled in a bushing 77 mounted in the fixed support plate 71 while its other end passes through an enlarged aperture 78 in the mounting block 67 and is journalled in a pilot hole 79 provided in the bushing 68.

The shaft 76 is adapted to be rotated to-and-fro through a small angle by a horizontally extending input shaft 80 journalled in the sleeve bushing 68 which is fixedly mounted in an aperture 81 provided in the mounting block 67. As aforementioned, the bushing 68 extends from the mounting block 67 into the pilot hole 69 in the attachment plate 39. The pilot hole 69 is supportive of the bushing 68 but slightly enlarged to allow assembly and disassembly of the mounting block 67. One end of the shaft 80 extends externally of the recording mechanism 23 for operation by the actuating mechanism 32 and is retained in this position between a spaced sleeve 82 surrounding the shaft 80 abutting a snap ring 83 mounted on the shaft and the mesh of a pair of miter gears 84 and 85, the miter gear 84 being attached to the other end of the input shaft 80 by a differential screw 86. The other miter gear 85 is mounted on and secured to the shaft 76 by a pin 87.

As illustrated in FIG. 7, the differential screw 86 includes a first threaded portion 88 for threadedly engaging a tapped aperture 89 provided in the end of the input shaft 80 lying internally of the housing 33. The differential screw 86 also includes a second threaded portion 90 which is of a larger diameter than the threads engaging the input shaft 80 and which threadedly engages a tapped bore 91 provided in the miter gear 84. Accordingly, rotation of the shaft 80 to-and-fro through a small angle will also rotate the shaft 76 through preferably the same small angle of movement.

Figure 6:
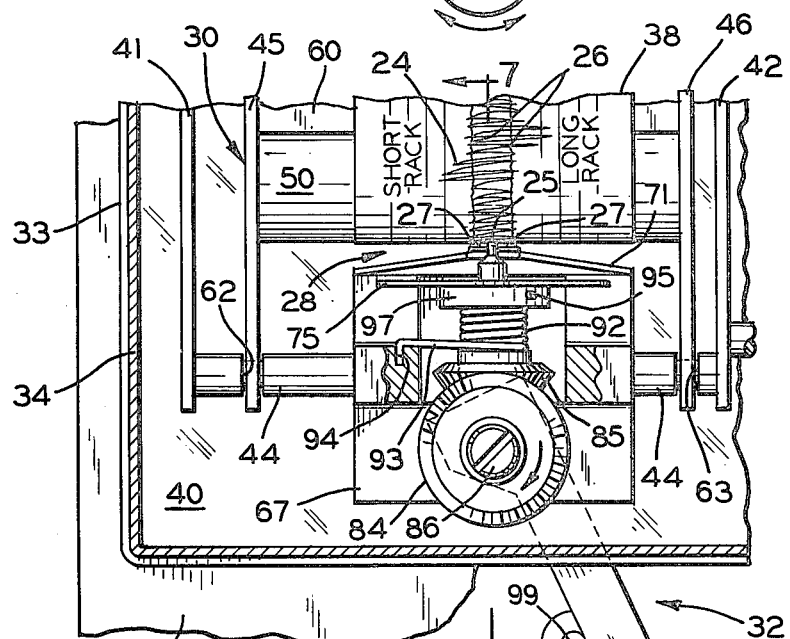
FIG. 6 is an enlarged fragmentary front view illustrating details of the recording mechanism.

A torsion spring 92 having an arm 93 engaged in an aperture 94 provided in the mounting block 67 and an arm 95 engaged in an aperture 96 provided in a tang 97 depending from the oscillating plate 75 urges the shaft 76 and thus miter gear 85 attached thereto in a counterclockwise direction and the gear 84 in a clockwise direction as viewed in FIG. 6. An inspection of FIG. 7 shows the screw threads of the portions 88 and 90 of the differential screw 86 to be of different pitch and same rotation and designed to react against the force of the torsion spring 92 to lock the miter gear 84 to the shaft 80. Thus, for a given rotational position of the differential screw 86 relative to the shaft 80, a particular and precise relationship is established between input shaft 80 and the output shaft 76 through the mesh of the miter gears 84 and 85. For example, when the miter gear 84 is in a bottom or locked position against the end of the shaft 80 as shown in FIG. 7, torsion spring 92 urges the miter gear 84 through its mesh with miter gear 85 in a clockwise rotation as viewed in FIG. 6. This urges the miter gear 84 to a locked position between the threaded portion 90 of the differential screw 86 and the abutting surfaces of the miter gear 84 and the end of the shaft 80. The threaded portion 89 of the differential screw 86 is likewise urged to a locked position with respect to shaft 80 by the torsion spring 92. Thus, the miter gear 84, the differential screw 86 and the input shaft 80 rotate as a unit and are urged in a clockwise rotation for a purpose to be described hereinafter. On the other hand, when the differential screw 86 is restrained from rotation and the miter gear 84 is rotated in a counterclockwise direction, the miter gear 84 is moved axially away from its locked position and into a loose mesh with miter gear 85. Thus, when the gear 84 is held in a loose or unlocked position and the differential screw 86 is rotated in a counterclockwise rotation, the miter gear 84 moves axially toward a different locked position with respect to the shaft 80. This in turn changes the relationship of the input shaft 80 with the output shaft 76. Accordingly, the miter gear 84 can be set and locked to establish an infinite number of precise relationships between the shafts 80 and 76 and provides a convenient reliable method of corelating the position of the stylus 25 with respect to the fixed positions of the styli 28 for a particular governor balance position.

Figure 9:
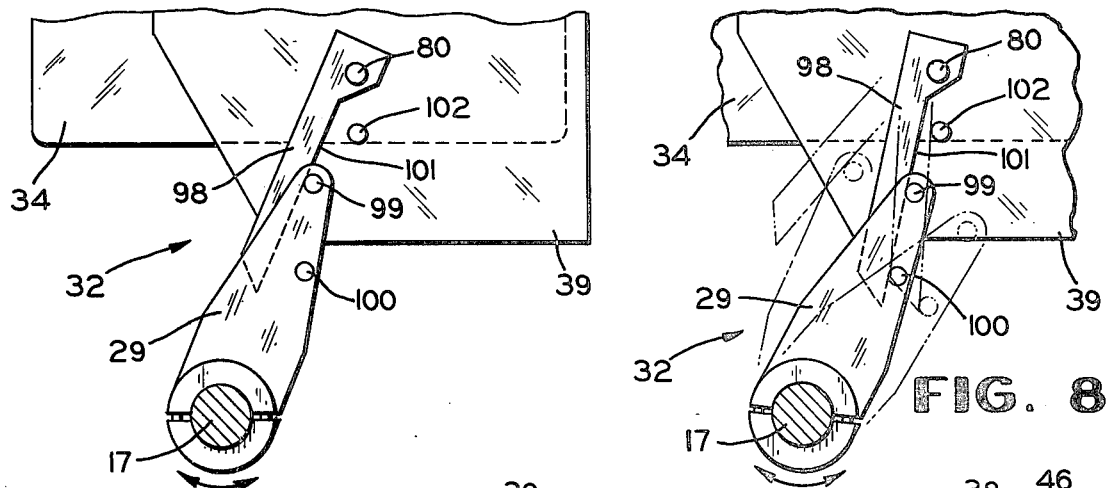
FIG. 9 is a view similar to FIG. 8 but illustrating the position of the actuating mechanism when the recording apparatus is to be calibrated.

The actuating means 32 for rotating the input shaft 80 to-and-fro through the small angle of rotational movement includes a follower arm 98 connected thereto and the crank arm 29 connected to the lay shaft 17 for movement therewith. The crank arm 29 is provided with first and second drive pins 99 and 100 respectively which engage the side edge 101 of the follower arm 98 to cause the arm 98 to follow the motion of the crank arm 29 as shown in FIGS. 8 and 9. As illustrated in FIG. 8, the pins 99 and 100 alternately drive the follower arm 98 in a clockwise direction while the torsion spring 89 urges the follower arm 98 to move in a counterclockwise direction against pins 99 or 100 or until it abuts a stop pin 102. Thus, when the first drive pin 99 drives the follower arm 98, the movable stylus 25 is driven at a high ratio of travel with respect to the lay shaft 17 and when the second drive pin 100 drives the follower arm 98, the movable stylus 25 is driven at a low ratio of travel with respect to the lay shaft 17. This arrangement is of particular importance as will become more apparent in the following description.

From the foregoing discussion, it can be seen in FIG. 8 that the follower arm 98 is engaged alternately with pins 99 and 100. The high ratio between lay shaft 17 and movement of stylus 25 affected by engagement of pin 99 with the follower arm 98 provides a high degree of resolution of the trace of the movable stylus 25 in respect to the datum or normal area of the chart paper in the "short rack" or overloaded area and into a significant area of the "long rack" or underloaded area. Accordingly, this structural arrangement provides a precise means of estimating governor balance position in terms of rack scale values or in terms of power output. The low ratio effected by the engagement of the pin 100 with the follower arm 98 allows recording of all low power balances which require a less precise analysis of the non-normal operation of the locomotive.

Referring particularly to FIGS. 4 and 7, when the cartridge 30 is installed on the chassis 33, the styli 25 and 28 contact the chart paper 38 and bear against the lower idler roller 50 which serves as a platen for the styli. The chart paper 38 is pressure sensitive so as to be marked by the pressure of the styli.

Since high horsepower locomotives operate most efficiently in the eighth (8th) throttle position or highest power setting, the calibration of the recording apparatus 23 will be discussed in relation thereto. However, it should be noted that the recording apparatus 23 may be calibrated for any throttle setting. In the eighth (8th) throttle setting, the apparatus 23 is calibrated by locking the governor 14 (with the engine 10 off) at the specified rack scale position indicated by the scale and pointer device 21 for normal eighth (8th) throttle operation. With the governor 14 in this position, the crank arm 29 of the actuating mechanism 32 is set and clamped to the lay shaft 17 so that the centerlines of the lay shaft 17, the drive pin 99 and the input shaft 80 are aligned as illustrated in FIG. 9. Then to calibrate apparatus 23, the movable stylus 25 is positioned to lie substantially between the pair of stationary styli 28 and locked in place as viewed in solid lines in FIG. 5. For example, assuming that prior to the calibration of apparatus 23, with the governor 14 locked and the actuating mechanism 32 set as previously described, the movable stylus 25 is randomly located and locked at some position other than the desired calibration position such as at position "A" illustrated in dotted lines in FIG. 5. As previously described, stylus 25 is unlocked by constraining differential screw 86 from rotation preferably by engaging the slotted head of differential screw 86 with a screw driver and forcibly rotating the oscillating plate 75 in a clockwise direction as viewed in FIG. 5. This action will cause the counterclockwise rotation and unlocking of the miter gear 84 from the shaft 80 through its mesh with miter gear 85 as viewed in FIG. 6. Stylus 25 is now free to be moved and held at the calibrated position shown in solid lines in FIG. 5, while the differential screw 86 is rotated counterclockwise until the miter gear 84 is again bottomed and locked to the shaft 80. Also assuming as before, that the stylus 25 is randomly located at position "b" as illustrated in dotted lines in FIG. 5, the stylus 25 is unlocked as previously described. However, the miter gear 84 must now be held in the loose or unlocked position while the differential screw 86 is rotated slightly in a counterclockwise direction. This action increases the looseness of the mesh of the miter gear 84 by moving it further axially away from the end of the shaft 80. It is now possible to position and lock stylus 25 in the calibrated position as described before. After the stylus 25 is locked in its calibrated position, the governor 14 is released from its locked position and the recording apparatus 23 is now set to record the trace 24 produced by the movabe stylus 25 between the pair of datum traces 26 produced by the stationary styli 28 when the governor 14 balances at its normal eighth (8th) throttle rack scale position. Accordingly, when the chart paper 38 is advanced by the take-up spool 53, the pair of datum traces 26 will be marked on the paper at a specified location and the trace 24 will be marked on the chart paper 32 in relation thereto.

As previously described, the area between the datum traces 26 represents the normal governor balance of the engine at a particular throttle setting. Thus, as best illustrated in FIG. 6, when the second trace 24 produced by the movable stylus 25 lies to the left and outside the datum traces 26, that is in the "short rack" area it indicates that the engine is operating in an overloaded condition and when the second trace 24 lies to the right of and outside of datum traces 26, that is in the "long rack" area, the engine 10 is operating in an underloading condition or lower power range. Momentary excursions of the trace 24 may extend beyond the datum lines 26 for short periods of time. These short periods of excursions of the trace 24 beyond the datum traces 26 are of no concern as they are caused by automatic corrective action as previously described due to sudden changes in the load and engine response from a lower throttle setting to a higher throttle setting. However, other conditions such as prolonged wheel slip correction due to uneven wheel wear or low power balance due to faulty drive or control components of the locomotive or high power balance or "short rack" conditions due to plugged fuel lines or filters will cause the trace 24 to be produced outside the datum traces 26 for long periods of time. This type of trace is of importance as it indicates that the engine of the locomotive is operating under non-normal conditions, and as previously discussed, the recorded traces on the chart paper indicate the non-normal operating conditions of the locomotive.

It is to be understood that the form of the invention herewith shown and described is to be taken as an illustrative embodiment only of the same, and that various changes in the shape, size and arrangement of the parts may be resorted to without departing from the spirit of the invention.

I claim:

1. A recording apparatus for producing a graphic representation representing the operating performance of a railroad locomotive having a diesel engine commanded by a governor, the apparatus comprising:

a. a record paper device including drive means for moving the record paper linearly in proportion to time;
b. means for actuating said drive means; and
c. a recording mechanism for producing the graphic representation upon the record paper by plotting a trace representing actual engine governor balance positions relative to the normal governor balance position, said recording mechanism comprising:
 1. means for producing a pair of spaced-apart parallel datum traces on the record paper representing the normal governor balance position;
 2. means for producing a second trace on the record paper in relation to said datum traces, said second trace indicating actual governor balance positions; and
 3. means operatively connected to the diesel engine for moving said second trace producing means in accordance with the actual governor balance positions of the diesel engine.

2. A recording apparatus for producing a graphic representation representing the operating performance of a railroad locomotive, as claimed in claim 1, wherein said record paper device includes a roller over which the record paper moves and said recording mechanism includes a pair of fixed styli for producing said pair of parallel datum traces and a movable stylus for producing said second trace, all said styli bearing against said roller.

3. A recording apparatus for producing a graphic representation representing the operating performance of a railroad locomotive as claimed in claims 1 or 2, wherein said parallel datum trace producing means and said second trace producing means are mounted on a common support and said parallel datum trace producing means comprise a plate member fixedly attached to said common support, a bifurcated spring member attached thereto and wherein a stylus is mounted on each bifurcated end of said spring plate.

4. A recording apparatus for producing a graphic representation representing the operating performance of a railroad locomotive as claimed in claim 2, wherein said parallel datum trace producing means and said second trace producing means are mounted on a common support and said second trace producing means comprise an input shaft journalled in said common support, an output shaft journalled in said common support and extending normal thereto, a pair of miter gears drivingly interconnecting said shafts, an oscillating plate mounted on said output shaft for movement therewith and said movable stylus is mounted on said oscillating plate, all of said styli bearing against said record paper device.

5. A recording apparatus for producing a graphic representation representing the operating performace of a railroad locomotive as claimed in claim 4, wherein said second trace producing means includes means for positioning said second trace producing means relative to said datum trace producing means.

6. A recording apparatus for producing a graphic representation representing the operating performace of a railroad locomotive as claimed in claim 5, wherein said positioning means includes means for locking said second trace producing means in a selected position.

7. A recording apparatus for producing a graphic representation representing the operating performance of a railroad locomotive as claimed in claims 5 or 6, wherein said positioning means comprises a differential screw having a pair of threaded portions wherein one portion threadedly mounts said differential screw to one end of said input shaft and one of said miter gears of said pair of miter gears is threadedly mounted on the other portion of said differential screw so that rotation of said differential screw relative to said input shaft allows said miter gears to be meshed together in a specific relation and said movable stylus to be positioned in a precise relationship to said pair of fixed styli.

8. A recording apparatus for producing a graphic representation representing the operating performance of a railroad locomotive as claimed in claim 4, wherein the diesel engine includes a lay shaft and said actuating means comprises a follower arm mounted on the end of input shaft and a crank arm connected to said lay shaft for movement therewith, said crank arm including first and second drive pins for moving said follower arm in accordance with movement of said lay shaft.

9. A recording apparatus for producing a graphic representation representing the operating performance of a railroad locomotive as claimed in claim 8, wherein the center lines of said lay shaft, said first drive pin and said input shaft are aligned to lie in a common plane when the governor is in its balanced position and the diesel engine is operating at its said governor balance.

10. A recording apparatus for producing a graphic representation representing the operating performance of a railroad locomotive as claimed in claims 8 or 9, wherein said first drive pin moves said follower arm and said movable stylus when the diesel engine is operating at its normal and/or critical non-normal governor balance positions.

11. A recording apparatus for producing a graphic representation representing the operative performance of a railroad locomotive as claimed in claims 8 or 9, wherein said second drive pin moves said follower arm and said movable stylus when the locomotive is operating at all other governor balance positions.

* * * * *

UNITED STATES PATENT AND TRADEMARK OFFICE
CERTIFICATE OF CORRECTION

PATENT NO. : 4,184,166
DATED : January 15, 1980
INVENTOR(S) : Herbert H. Olson

It is certified that error appears in the above-identified patent and that said Letters Patent are hereby corrected as shown below:

```
Col.  3, line 19, cancel "a" (second occurrence)
Col.  5, line 66, "spaced" should be --spacer--
Col.  8, line 18, "movabe" should be --movable--
         lines 36 and 37, "underloading" should be --underloaded--
Col. 10, line 29, after "of" insert --said--
```

Signed and Sealed this

Twenty-ninth Day of April 1980

[SEAL]

Attest:

SIDNEY A. DIAMOND

*Attesting Officer*  *Commissioner of Patents and Trademarks*